United States Patent Office 3,228,613
Patented Jan. 11, 1966

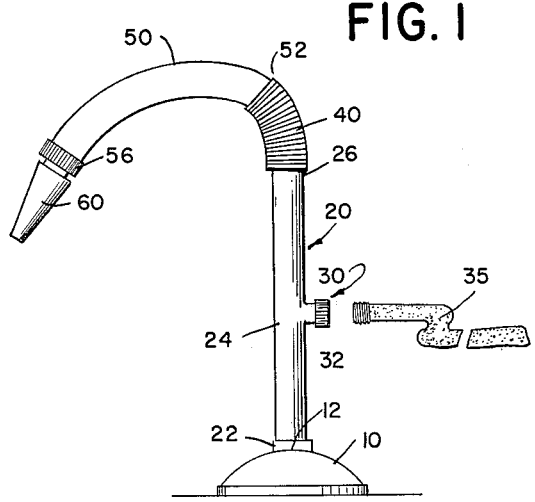
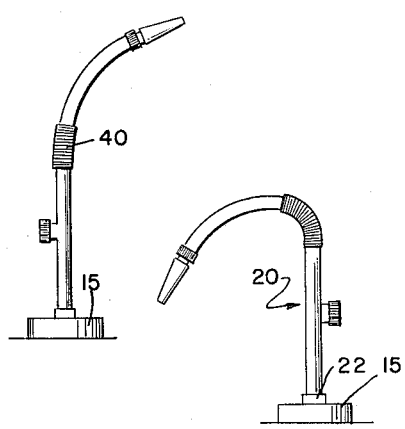
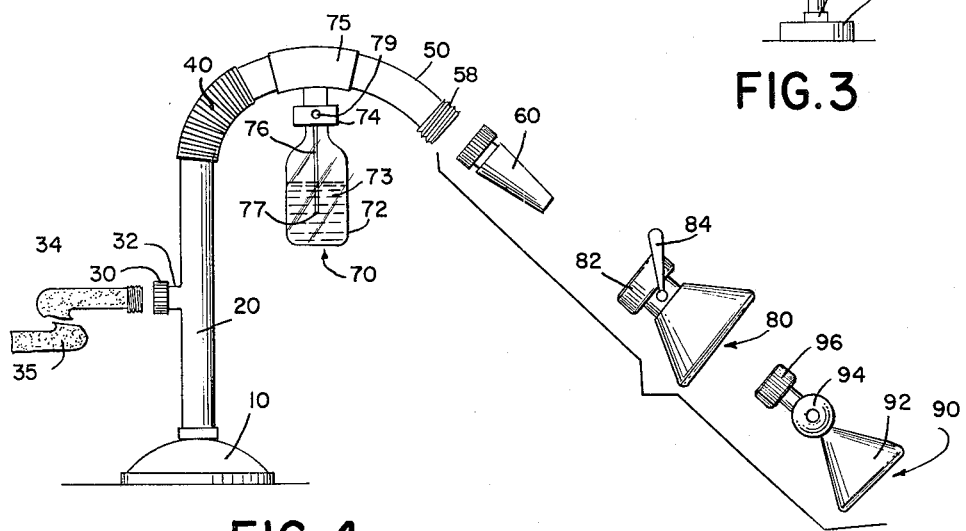

3,228,613
SPRAYING ATTACHMENT WITH BASE
Munsey S. Goldstein, 8201 16th St., Silver Spring, Md.
Filed July 10, 1964, Ser. No. 381,748
1 Claim. (Cl. 239—318)

This invention concerns a spraying attachment with base. The disclosure reveals a portable garden spraying attachment with base for selectively directing a stream of water.

Washing automobiles, patios and large vinyl floors requires the use of a hose. Between wetting, washing and rinsing operations, the hose must be laid down. Much water is wasted, and the wasted water further adds to the unpleasantness of the task by soaking the surrounding area. Thus, well-known byproducts of washing automobiles are wet shoes and dripping trouser cuffs.

Heretofore, no simple equipment has been presented which satisfactorily will direct a fluid stream for washing large surfaces. Several devices have been developed which provide means for positioning a sprinkler head. However, no hose attachment has been developed to relocate the delivery end of a hose directly over the work surface and to selectively direct a stream of water flowing through the hose.

One object of this invention is the provision of a simple efficient hose holder.

Another object of this invention is to provide a portable hose attachment for fixedly relocating a hose terminus and selectively directing a stream of fluid.

A third object of this invention is the provision of a washing attachment for a hose which will accurately direct liquid over a surface to be washed.

Another object of this invention is to provide a hose attachment capable of conversion to several different positions of delivery.

This disclosure further provides a vehicle washer which, when firmly affixed on one point of a vehicle will direct water over the entire surface of the vehicle.

Another object of this invention is to provide a flexible hose attachment which will selectively direct a stream of suds or water. Further objects of this invention can be seen from the drawings in which:

FIGURE 1 is an elevation of the hose attachment, illustrating its basic elements;

FIGURES 2 and 3 are elevations showing how the delivery of fluids may be directed by the hose attachment;

FIGURE 4 is a plan view of the hose attachment configured for selectively directing a stream of suds or clear water from a hose, showing the adaptability of the attachment to various delivery heads.

Referring to FIGURE 1, suction cup base 10 is mounted on fixed surface 1. Base 10 defines a centrally located collar 12, which stretches to receive the closed lower end 22 of pipe 20. Located near the center 24 of upright pipe 20 is a hose receiver 30. A female coupling 34 is mounted on receiver neck 32, which communicates with the interior of pipe 20. Garden hose 35 attaches to coupling 34. Pipe 20 communicates with pipe 50 through a flexible joint 40 which is secured to the respective ends 26 and 52 of the pipes. Free end 56 of pipe 50 mounts a common hose nozzle 60. When using the hose attachment, suction cup 10 is mounted on a flat surface, and a garden hose 35 is secured in receiver 30. Pipe 50 and nozzle 60 are held in a desired position by flexible joint 40. Passing through the nozzle, a stream of water is directed precisely to the area at which it is needed.

FIGURES 2 and 3 illustrate two of the varied positions at which the nozzle can be aligned. In these drawings, suction cup base 10 has been replaced by permanent magnetic base 15. This configuration is useful particularly for mounting the hose attachment on metallic surfaces such as automobile roofs.

The deluxe commercial embodiment of the invention is shown in FIGURE 4. As in FIGURE 1, an upright pipe 20 is mounted in a suction cup base 10. Flexible joint 40 supports curved upper pipe 50. Mounted on the latter is a detergent feeding device 70, comprising detergent well 72 and feeding tube 76. Well 72 is held by screw cap 74 which is fixed to pipe-encircling holder 75. The lower end 77 of feeding tube 76 descends into detergent 73 within well 72. The open upper end of tube 76 extends into the interior of hose 50 so that detergent is drawn by suction into the fluid stream. Valve 79 selectively shuts off or allows the flow of detergent through tube 76.

The free end of the upper curved pipe terminates in male coupling 58. This coupling is configured to receive common hose nozzle 60. Alternatively, spray head 80 may be affixed to coupling 58 by female coupling 82. Valve 84 controls the flow of water through spray head 80. Swivel head 90, having female coupling 96, may also be mounted on coupling 58. In the latter commercially available device, conical shower head 92 is pivoted by swivel 94.

When used with a common hose nozzle, the hose attachment is a helpful aid in washing patios, vinyl floors, windows and vehicles. Used with the spray or swivel head, the device makes a convenient portable hand wash or foot wash for swimming pools. In its simple form, the attachment makes a handy portable water spigot.

Although the invention has been described by a specific embodiment, it will be obvious that its teaching may be employed in other embodiments, without departing from the scope of the invention. The precise scope of the invention is defined only in the appended claim.

I claim:

A hose outlet attachment, comprising: a suction cup base, a first pipe having closed and open ends, said closed end being fixed in said base, a hose coupling mounted on said first pipe intermediate said open and closed ends so as to be in communicating relationship with the interior of said first pipe, a water hose supply pipe connected to said hose coupling, a hollow, flexible coupling being attached at one end thereof to said open end of said first pipe, a second pipe having first and second open ends, said first end of said second pipe being fixed to the other end of said flexible coupling and opening into said flexible coupling in communicating relationship; a detergent feeding device mounted on said second pipe intermediate said first and second ends, said feeding device comprising a detergent containing well attached to said second pipe, a tube having a first open end immersed within said detergent and a second open end secured within the interior of said second pipe together with a valve mounted in said tube intermediate said first and second ends thereof to selectively control the flow of detergent therethrough; and nozzle means attached to said second end of said second pipe for jetting water and detergent, as desired, in the direction defined by said second end of said second pipe.

References Cited by the Examiner
UNITED STATES PATENTS

| | | | |
|---|---|---|---|
| 1,084,842 | 1/1914 | Bustin | 239—588 X |
| 2,724,583 | 11/1955 | Targosh et al. | 239—318 X |
| 2,893,644 | 7/1959 | Holden | 248—206 |
| 2,987,262 | 6/1961 | Goyette et al. | 239—350 |
| 3,066,875 | 12/1962 | Obidniak | 239—318 X |
| 3,071,081 | 1/1963 | Mullick | 239—318 X |
| 3,106,345 | 10/1963 | Wukowitz | 239—318 |

RAPHAEL M. LUPO, Primary Examiner.
LOUIS J. DEMBO, ROBERT B. REEVES,
F. R. HANDREN, Assistant Examiners.